(12) United States Patent
Gillow et al.

(10) Patent No.: US 8,703,078 B2
(45) Date of Patent: Apr. 22, 2014

(54) METHOD FOR BIOGEOCHEMICAL STABILIZATION OF CHROMATE-IMPACTED SOLIDS

(75) Inventors: Jeff B. Gillow, Castle Pines, CO (US);
John F. Horst, Schwenksville, PA (US);
Suthan S. Suthersan, Yardley, PA (US)

(73) Assignee: ARCADIS Corporate Services, Inc., Highlands Ranch, CO (US)

( * ) Notice: Subject to any disclaimer, the term of this patent is extended or adjusted under 35 U.S.C. 154(b) by 588 days.

(21) Appl. No.: 13/005,705

(22) Filed: Jan. 13, 2011

(65) Prior Publication Data
US 2011/0171723 A1 Jul. 14, 2011

Related U.S. Application Data

(60) Provisional application No. 61/294,709, filed on Jan. 13, 2010.

(51) Int. Cl.
*C01G 37/00* (2006.01)

(52) U.S. Cl.
USPC .............................. 423/55; 423/53; 588/318

(58) Field of Classification Search
USPC ............ 588/318, 313, 314, 319, 410; 423/53, 423/55, 61
See application file for complete search history.

(56) References Cited

U.S. PATENT DOCUMENTS

| | | | | |
|---|---|---|---|---|
| 3,784,669 A * | 1/1974 | Elges, III | ......................... | 423/43 |
| 6,221,002 B1 * | 4/2001 | James | ........................... | 588/256 |
| 7,645,092 B2 * | 1/2010 | Higgins | ................... | 405/128.75 |

* cited by examiner

*Primary Examiner* — Edward Johnson
(74) *Attorney, Agent, or Firm* — Nancy J. Flint, Esq.; Nancy J. Flint Attorney At Law, P.A.

(57) ABSTRACT

The invention relates to a system and method for the substantially permanent biogeochemical stabilization of solids impacted with hexavalent chromium/Cr(VI), including chromite ore processing residue ("COPR"). The invention comprises a novel treatment method of adding amendment(s) to COPR or other chromate impacted solids for the purpose of (1) weathering COPR minerals (when present) to convert the minerals that control alkalinity of the COPR to non-alkaline forms and liberate incorporated hexavalent chromium (Cr (VI)) in the process; (2) providing a chemical reductant (ferrous iron) to rapidly and permanently reduce the available Cr(VI) to trivalent form (Cr(III)); and/or (3) supporting longer-term biogeochemical Cr(VI) reduction enhanced by recycling of the chemical reductant, ultimately rendering the material non-hazardous as measured by acceptable methods. Amendments include but are not limited to acids; sources of ferrous iron; fermentable organic carbon source(s); and/or a source of active anaerobic microbes.

21 Claims, 4 Drawing Sheets

METHOD FOR BIOGEOCHEMICAL STABILIZATION OF CHROMATE-IMPACTED SOLIDS

RELATED APPLICATION

This patent application claims the benefit of U.S. Provisional Patent Application Ser. No. 61/294,709, filed on Jan. 13, 2010, the disclosure of which is incorporated herein in its entirety by reference.

FIELD OF THE INVENTION

The invention relates to a system and method for the substantially permanent biogeochemical stabilization of solids impacted with hexavalent chromium/Cr(VI), including chromite ore processing residue ("COPR"). The invention comprises a novel treatment method of adding amendment(s) to COPR or other chromate impacted solids for the purpose of (1) weathering COPR minerals (when present) to convert the minerals that control alkalinity of the COPR to non-alkaline forms and liberate incorporated hexavalent chromium (Cr (VI)) in the process; (2) providing a chemical reductant (ferrous iron) to rapidly and permanently reduce the available Cr(VI) to trivalent form (Cr(III)); and/or (3) supporting longer-term biogeochemical Cr(VI) reduction enhanced by recycling of the chemical reductant, ultimately rendering the material non-hazardous as measured by acceptable methods. Amendments include but are not limited to acids; sources of ferrous iron; fermentable organic carbon source(s); and/or a source of active anaerobic microbes.

BACKGROUND OF THE INVENTION

Solids impacted with hexavalent chromium/Cr(VI) can be difficult to treat, particularly in the case of COPR. Applicable treatment standards for Cr(VI) and/or total chromium in soils/solids can be broken into two categories, as follows:

Toxicity Characteristics:

this category refers to a determination of leachable chromium. Solids impacted with chromium are regulated by the United States Environmental Protection Agency ("USEPA"), as well as localities to prevent the improper land disposal of material that is characteristically hazardous due to leaching. The USEPA has established 5 milligrams per liter (mg/L) by the Toxicity Characteristic Leaching Procedure ("TCLP") as the limit for total chromium (sum of Cr(VI) and Cr(III) in leachate) at/above which the material tested is considered characteristically hazardous. For such materials, Land Disposal Restrictions require a minimum 90-percent reduction in leachability through treatment, with residual leachability no more than 10-times the universal treatment standard for total chromium, which is 0.6 mg/L (as determined by TCLP). As an additional consideration for treated materials to be protective of groundwater, the USEPA has established a maximum contaminant level of 100 micrograms per liter (µg/L) for total chromium in drinking water. Separate standards specific to Cr(VI) are also being considered.

Solid Concentrations:

this category refers to a determination of chromium (Cr (III) or Cr(VI)) concentration in the impacted solids. An example of treatment standards for solid phase concentrations is provided by the state regulations in New Jersey; this state has numerous sites where chromite ore was processed and resultant COPR impacts in soil:

120,000 mg/kg Cr(III) for residential properties.

240 mg/kg Cr(VI) for residential properties, potentially being revised to 1 mg/kg.

20 mg/kg Cr(VI) for industrial properties.

The mineral chromite is the only commercial source of chromium; it is a spinel ($FeO.Cr_2O_3$). In its natural form, chromite is a mixture described by the formula ($Fe^{2+}$,Mg)O. ($Cr,Al,Fe^{3+})_2O_3$ and it rarely contains more than 50% $Cr_2O_3$. Other minerals such as $SiO_2$ can be present (See Habashi, F., 1997. Handbook of Extractive Metallurgy, Volume IV. pp. 1761-1812).

The acronym "COPR" is used to describe chromite ore processing residues, the residues created by historical extraction of chromium from chromium (chromite) ore for industrial purposes. This was historically completed by heating pulverized ore with soda ash ($Na_2CO_3$) and lime (CaO) at around 1100° C. This would oxidize the insoluble Cr(III) to Cr(VI), making it available for extraction primarily as sodium chromate ($NaCrO_4$). The resulting solids were disposed in a variety of manners, including use as fill material in and around the original manufacturing sites.

These solids can exhibit the following primary characteristics:

High Concentrations of Cr(VI).

After the oxidative process, the roast is a mixture of soluble salts and insoluble components including sodium chromate, sodium aluminate, magnesium oxide, sodium vanadate, iron (III) oxide, unused alkali, unchanged chromite and sodium chloride. Extraction of the roast with hot water yields a pH of 10-11, and the pH is controlled so that the chromate dissolves and the alkali-soluble impurities hydrolyze and form a filterable precipitate. This process is inefficient at leaching all of the chromate from the COPR during processing. Consequently, total Cr(VI) concentrations in the soils/solids at COPR impacted sites can range into the single-digit percent by weight range (with one percent by weight equaling 10,000 mg/kg). This includes a fraction that is readily susceptible to leaching and a fraction that is incorporated into agglomerated solids and/or the various minerals comprising the COPR solids. Thus, the residual Cr(VI) associated with COPR is both a long term threat to the environment due to mobility, and hard to treat due to the challenge of access within the COPR solids. The elevated concentrations can also inhibit effective bioremediation due to toxicity.

Highly Alkaline.

Materials with significant concentrations of COPR are characteristically alkaline, typically exhibiting a pH greater than 12. This is buffered over the long term by the slow hydration of the primary oxide minerals in the COPR into hydroxides, specifically dissolution and secondary precipitation of calcium aluminate phases. Solid phases in COPR that contain Cr(VI) are chromium(VI) hydrocalumite ($Ca_4Al_2(OH)_{12}CrO_4.6H_2O$) and Cr(VI)-substituted hydrogarnet ($Ca_3Al_2(H_4O_4)_3$). When the pH decreases below 11.2, chromium(VI) ettringite ($Ca_6Al_2(OH)_{12}$—$(CrO_4)_3.26H_2O$) is likely to be present.

Minerals, in addition to chromite, that have been identified in COPR include periclase (MgO), brucite ($Mg(OH)_2$), and calcite ($CaCO_3$) derived from the addition of lime and dolomite; and brownmillerite ($Ca_2(Al,Fe,Cr)_2O_5$), which is associated with Cr(III) (See Geelhoed, J. S., Meeussen, J. C. L., Roe, M. J., Hillier, S., Thomas, R. P., Farmer, J. G., and Paterson, E., 2003, Chromium Remediation Or Release? Effect Of Iron(II) Sulfate Addition On Chromium(VI) Leaching From Columns Of Chromite Ore Processing Residue, Environmental Science and Technology 37: 3206-3213). Buffering of the pH by COPR is dominated by the dissolution of Ca-containing phases. The alkaline pH created by many of these minerals can impede treatment by chemical reductants such as ferrous iron, by encouraging oxidation of the iron thereby limiting its distribution. Because oxygen can be an effective oxidant of Cr(III) at high pH, if the alkalinity is not overcome the potential for long-term oxidation of precipitated Cr(III) back to Cr(VI) can increase based on residence time, availability of moisture, and abundance of oxygen.

Susceptibility to Heaving.

As the COPR minerals weather/hydrate, some of the hydration products can result in lithification/cementation at various scales. As the weathering continues, mineral grains trapped in a cemented matrix will decrease in density and increase in volume (See Dermatas, D., Chrysochoou, M., Moon, D. H., Grubb, D. G., Wazne, M., and Christodoulatos, C., 2006, Ettringite-Induced Heave In Chromite Ore Processing Residue (COPR) Upon Ferrous Sulfate Treatment. Environmental Science and Technology 40: 5786-5792). This is important in the case of ettringite [$Ca_6(Al(OH)_6)_2 \cdot (SO_4)_2 \cdot 26H_2O$], a known expansive mineral both in the cement and soil literature, and delayed ettringite formation (DEF) is one of the main mechanisms of concrete deterioration (See Taylor, H. F. W., Famy, C., 2001, Scrivener, K. L. Review Delayed Ettringite Formation, Cement and Concrete Research, 31, 683-693). Depending on the magnitude of the bulking compared to the available porosity and the degree of rigidity exhibited by the surrounding matrix, this can result in surface heaving. This is not an issue at all COPR sites, but is an important consideration relative to the re-development potential of affected properties.

A majority of the existing treatment approaches for COPR involve the use of chemical reductants to reduce the Cr(VI) to Cr(III). Such approaches require significant amounts of costly reagents to account for the mass of Cr(VI). A common reductant for Cr(VI) is ferrous iron, supplied in the form of ferrous sulfate to promote the following reaction (Eary, L. E., and Rai, D., 1988, Chromate Removal From Aqueous Wastes By Reduction With Ferrous Iron, Environmental Science and Technology 22: 972-977):

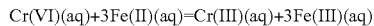

This reaction ignores all of the possible complexes of aqueous Cr and Fe, however Cr(III) rapidly hydrolyzes to form insoluble $Cr(OH)_3$ at circumneutral pH, as does Fe(III) to precipitate as iron oxyhydroxide. An important consideration in the use of ferrous sulfate is the poor solubility of this reagent at circumneutral pH and under oxic conditions; and extremely poor solubility at alkaline pH and highly oxidizing conditions, characteristic of the COPR. Therefore, delivery and distribution can be challenging when using this reagent.

Work in the lab by Geelhoed et al. with COPR from Glasgow, UK (10,000 mg/kg Cr(VI)) showed that the addition of 1 g/L ferrous iron as ferrous sulfate was ineffective for treatment due to the immediate precipitation of iron in response to the highly alkaline conditions. In addition, sulfate displaced chromate from hydrocalumite ($Ca_4Al_2(OH)_{12}CrO_4 \cdot 6H_2O$).

Similarly, field application of solid ferrous sulfate (30-50 wt. %), mixed into COPR (4,000 mg/kg Cr(VI)) with augers resulted in incomplete treatment of the Cr(VI) and did not result in neutralization of the alkaline minerals in the COPR (See Dermatas). In addition, this method was determined to be uneconomical because of the high concentration of ferrous sulfate that was required.

Work by Su and Ludwig summarized a field test involving injection of 5700 L of a 0.07 M $FeSO_4$+0.07 M $Na_2S_2O_4$ solution into a COPR saturated zone (pH 11.5) indicated no well and formation clogging during injection. (See Su, C., and Ludwig, R. D., 2005, Treatment Of Hexavalent Chromium In Chromite Ore Processing Solid Waste Using A Mixed Reductant Solution Of Ferrous Sulfate And Sodium Dithionite, Environmental Science and Technology 39(16): 6208-6216). Examination of a core collected 0.46 m from the injection well following injection indicated effective treatment of the solid phase Cr(VI) based on analysis of water, phosphate solution, and high temperature alkaline extracts. The combined reductant solution also imparted a residual treatment capacity to the COPR allowing for subsequent treatment of dissolved phase Cr(VI); however, dissemination of the iron in the highly alkaline environment appeared to be impeded by the inability to sufficiently lower the pH with distance from the injection well to avoid precipitation of $Fe(OH)_2$ and likely also $FeCO_3$. Injection of a 0.2 M $FeSO_4$+ 0.2 M $Na_2S_2O_4$ solution into another COPR saturated zone (pH 9) indicated much more effective dissemination of the injected iron. Post-treatment Scanning electron microscopy—energy dispersive x-ray spectroscopy analyses of post treatment core samples indicated that much of the Cr(VI) may be removed through the formation of a Cr-bearing precipitate, possibly a complex carbonate, characterized by a Fe:Cr molar ratio of roughly 1:1 (See Ludwig, R. D., Su, C., Lee, T. R., Wilking, R. T., and Sass, B. M., 2008, In Situ Source Treatment Of Cr(VI) Using A Fe(II)-Based Reductant Blend: Long-Term Monitoring And Evaluation, Journal of Environmental Engineering 134(8): 651-658).

An even more stable solubility controlling phase for Cr is the Fe—Cr hydroxide solid solution (Sass, B. M., and Rai, D., 1987, Solubility Of Amorphous Chromium(III)-Iron(III) Hydroxide Solutions. Inorganic Chemistry 26: 2228-2232):

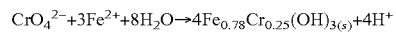

The solubility of the mixed Fe—Cr hydroxide is two orders of magnitude lower than the Cr hydroxide solid and the creation of this phase is desirable for achieving COPR treatment with long-term stability relative to decreased leaching of Cr.

Other means of reducing Cr(VI) to Cr(III) involve the use of elemental iron, iron sulfide, organic compounds, microbial activity, and sulfide, as detailed here.

U.S. Patent Application Publication No. US2004/0126189 titled "Method for stabilizing chromium-contaminated materials" prepared by A. K. Chowdhury discloses an in-situ method that uses the sulfuric acid/ferrous iron solution created from the oxidization of pyrite for treatment of COPR. The method involves application of the iron and acid to the top of a column of COPR.

U.S. Pat. No. 5,304,710 titled "Method of detoxification and stabilization of soils contaminated with chromium ore wastes" and issued to Kigel, M. Y., et al., discloses and ex-situ method that involves the acidification of the COPR to pH 3 using sulfuric acid, followed by treatment with a ferrous sulfate solution, and then once the Cr is reduced, raising the pH back up to pH 7.5 to 8.2 with cement or cement kiln dust. The acidification step for this process is performed in order to speed up the kinetics of Cr(VI) reduction by ferrous iron, and to maintain the ferrous iron in the dissolved form.

U.S. Pat. No. 7,452,163 titled "Method of treatment, stabilization, and heave control for chromite ore processing residues (COPR) and chromium contaminated soils" and issued to Wazne, M., et al., discloses a process that considers both the minerals that dissolve rapidly in response to acid addition, and those that dissolve more slowly over time resulting in pH rebound to alkaline conditions. Strong mineral acid (hydrochloric acid) is applied to the COPR along with water as a heat sink for the exothermic reaction. Ferrous iron is also described as beneficial for pH neutralization because of the protons ($H^+$) that are released when ferrous iron hydrolyzes or oxidizes to ferric iron. The heave potential is ameliorated by decreasing the pH to below 10, where the ettringite matrix is transformed to calcite, gypsum, and amorphous alumina. Sulfate is used to complete the transition from brownmillerite to ettringite, to consume aluminum and incorporate it into ettringite. Chemical reductants are added (ferrous chloride, ferrous sulfate, calcium polysulfide, or sodium bisulfide) when the pH is less than 10. Finally, the treated COPR is mixed with asphalt to encapsulate it, or with barium hydroxide to further control chromium leaching.

U.S. Pat. No. 5,562,588 titled "Process for the in situ bioremediation of Cr(VI)-bearing solids" and issued to Thomas E. Higgins discloses a process that incorporates a solid or semi-solid organic material containing bacteria, nutrients, and mineral acid to maintain the pH between 6.5 and 9.5 to promote biochemical reduction of Cr(VI) to Cr(III) in-situ. This process does not account for the potential toxicity of very high concentrations of Cr(VI) in the COPR that can inhibit microbial growth and effective bioreduction of Cr(VI). In addition, the claim details instances of poor microbial growth, likely due to the combination of the addition of organic material and mineral acid.

Experience with other reductants includes polysulfide application in the field. Moon et. al. applied acid and 10-20 wt. % solutions of calcium polysulfide. (See Moon, D. H., Wazne, M., Dermatas, D., Christodoulatos, C., Sanchez, A. M., Grubb, D. G., Chrysochoou, M., and Kim, M. G., 2007, Long-Term Treatment Issues With Chromite Ore Processing Residue (COPR): Cr6+ Reduction And Heave, Journal of Hazardous Materials 143(3): 629-635). The results were incomplete treatment (40% of Cr(VI) in the COPR was reduced) and little change in the mineralogy of the COPR. Once the temporary reducing capacity was overwhelmed there was a rebound in Cr(VI) concentrations.

SUMMARY OF THE INVENTION

The invention relates to a system and method for the substantially permanent biogeochemical stabilization of solids impacted with hexavalent chromium/Cr(VI), including COPR. The invention comprises a novel treatment method of adding amendment(s) to COPR or other chromate impacted solids for the purpose of (1) weathering COPR minerals (when present) to convert the minerals that control alkalinity of the COPR to non-alkaline forms and liberate incorporated Cr(VI) in the process; (2) providing a chemical reductant (ferrous iron) to rapidly and permanently reduce the available Cr(VI) to trivalent form (Cr(III)), and/or (3) supporting longer-term biogeochemical Cr(VI) reduction enhanced by recycling of the chemical reductant, ultimately rendering the material non-hazardous as measured by acceptable methods. Amendments include but are not limited to acids; sources of ferrous iron; fermentable organic carbon source(s); and/or a source of active anaerobic microbes.

One embodiment of the invention comprises a process for treating chromium in COPR that first involves addition of inorganic acid to reduce the pH to a point that can support both biological and chemical treatment. Next, the addition of ferrous iron supports immediate reduction of hexavalent chromium (Cr(VI)) to Cr(III) on surface sites and in pore water as well as providing a source of renewable and long-term reductive poise. The chemical reduction step also continues the process of displacing Cr(VI), weathering parent minerals, and stabilizing pH. A strongly anaerobic environment is then created with a fermentable organic substrate. This provides a very efficient source of electrons for biological Cr(VI) reduction, enhanced by allowing the iron delivered in the previous step to go through multiple cycles of reduction and oxidation. Fermentation generates additional acidity to promote mineral weathering and pH stabilization, and the longer residence time of this step can reduce more recalcitrant incorporated Cr(VI). This process achieves substantially complete treatment of Cr(VI) in the COPR and ameliorates concerns related to mineralogical heaving.

DESCRIPTION OF THE DRAWINGS

The invention will be described with reference to the accompanying drawings, in which like elements are referenced with like numerals.

DETAILED DESCRIPTION OF THE INVENTION

Figure 1:
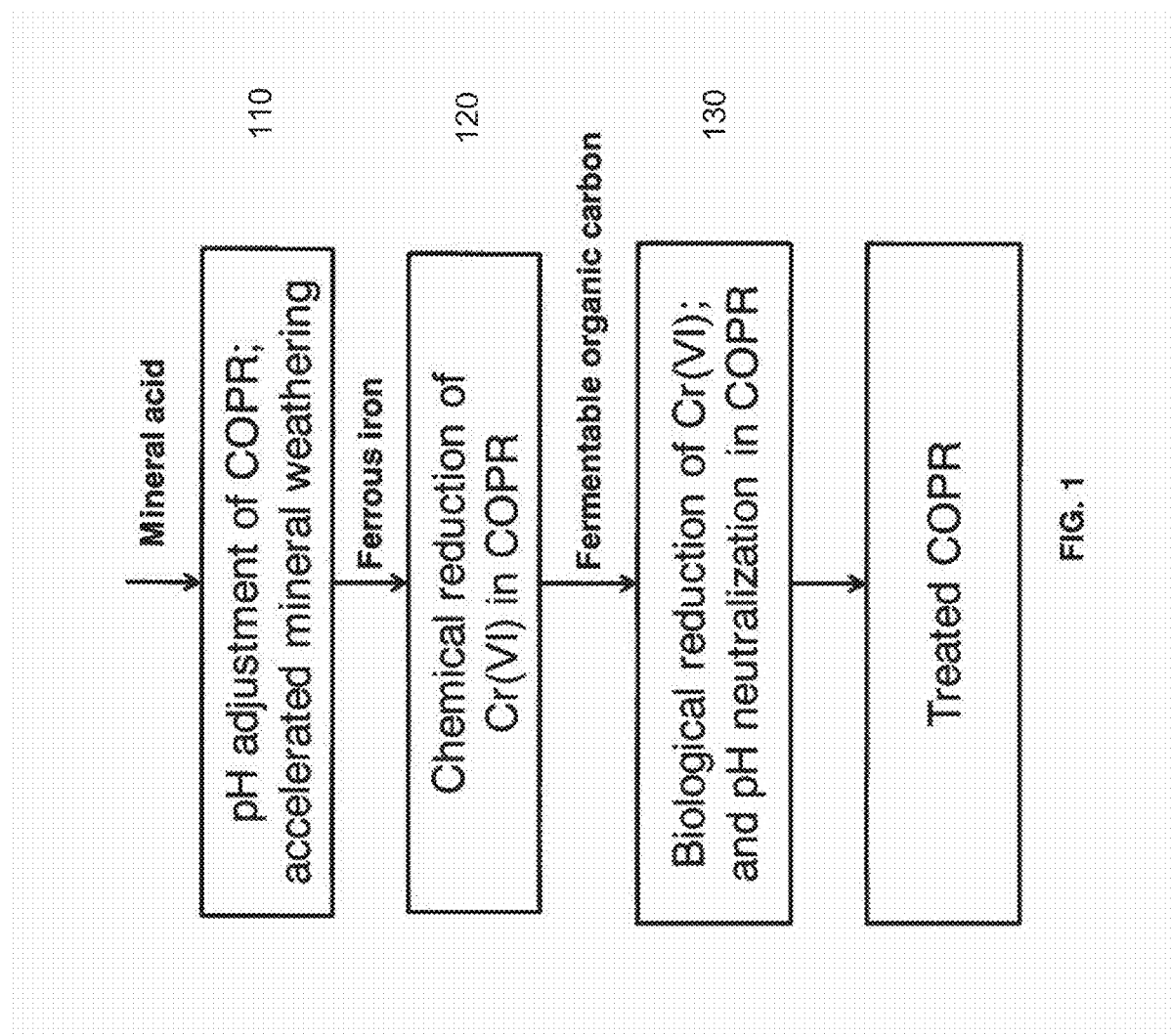
FIG. 1 provides an illustration of the process according to one embodiment of the invention.

The system and method of the invention was developed to provide a method for the permanent biogeochemical stabilization of chromate impacted solids, including COPR. The invention relates to a novel treatment method of adding amendment(s) to COPR or other chromate impacted solids for the purpose of (1) weathering COPR minerals (when present) to convert the minerals that control alkalinity of the COPR to non-alkaline forms and liberate incorporated Cr(VI) in the process; (2) providing a chemical reductant (ferrous iron) to rapidly and permanently reduce the available Cr(VI) to trivalent form (Cr(III)), and/or (3) supporting longer-term biogeochemical Cr(VI) reduction enhanced by recycling of the chemical reductant, ultimately rendering the material non-hazardous as measured by acceptable methods. Amendments include but are not limited to acids; sources of ferrous iron; fermentable organic carbon source(s); and/or a source of active anaerobic microbes.

One embodiment of the invention comprises a process for treating chromium in COPR that first involves addition of inorganic acid to reduce the pH to a point that can support both biological and chemical treatment. This compresses the long-term parent mineral weathering from many years to weeks or months and dissolves the key parent minerals that have sequestered Cr(VI), making it available for treatment, and beginning the process of long-term stabilization of pH. This step also limits long-term mineral bulking. Next, the addition of ferrous iron supports immediate reduction of hexavalent chromium (Cr(VI)) to Cr(III) on surface sites and in pore water as well as providing a source of renewable and long-term reductive poise. The chemical reduction step also continues the process of displacing Cr(VI), weathering parent minerals, and stabilizing pH. A strongly anaerobic environment is then created with a fermentable organic substrate. This provides a very efficient source of electrons for biological Cr(VI) reduction, enhanced by allowing the iron delivered in the previous step to go through multiple cycles of reduction and oxidation. Fermentation generates additional acidity to promote mineral weathering and pH stabilization, and the longer residence time of this step can reduce more recalcitrant incorporated Cr(VI). This process achieves complete treatment of Cr(VI) in the COPR and ameliorates concerns related to mineralogical heaving.

Weathering of COPR Minerals

In one embodiment of the invention, the invention relates to a novel treatment method of adding amendment(s) to COPR or other chromate impacted solids for the purpose of weathering the COPR minerals to convert the minerals that control alkalinity of the COPR to non-alkaline forms.

Amendment(s) include acids as needed to chemically weather minerals responsible for lithification, bulking, and buffering elevated pH. Mineral end products are formed that are stable over the long-term and stabilize pH at substantially neutral levels which can allow Cr(VI) reduction reactions to proceed at more rapid rates. Application of acids can also potentially displace Cr(VI) from the solid phases, making it available for treatment.

Mineral acids reduce the pH to a point that can support both biological and chemical treatment. This also compresses the long-term parent mineral weathering from many years to weeks or months. This step breaks up COPR nodules, weathers the key parent minerals that have sequestered Cr(VI) making it available for treatment, and begins the process of long-term stabilization of pH as well as limits long-term mineral bulking.

Suitable mineral acids include but are not limited to sulfuric acid; hydrochloric acid; nitric acid; and phosphoric acid. Sufficient acid would be added in a single application (over enough time to manage the heat of neutralization) to titrate the solid material being treated to an ambient pH at or below approximately 9.0 s.u. Acid demands to support this step will vary depending on the specific characteristics of the COPR involved, and so must be verified through titration testing at the bench scale.

Weathering by application of acids mitigates the long-term potential for elevated pH as well as the heave potential associated with long-term weathering. Controlled and accelerated weathering also provides for liberation of incorporated Cr(VI) through ion exchange, and for disaggregation of nodules of COPR material to provide more effective treatment.

Chemical Reduction of Cr(VI) to Cr(III).

In another embodiment of the invention, the invention relates to a novel treatment method of adding amendment(s) to COPR or other chromate impacted solids for the purpose of treating incorporated hexavalent chromium Cr(VI) by permanently reducing it to trivalent form.

Amendment(s) include a source of ferrous iron to support rapid abiotic reduction of Cr(VI) on surface sites and in pore water. This can help reduce highly elevated concentrations of Cr(VI) which would otherwise inhibit microbial activity. The chemical reactions (e.g., ferrous iron hydrolysis and oxidation to ferric iron and release of protons ($H+$)) that are part of this process may also yield additional acidity to help further stabilize pH in COPR materials.

The addition of ferrous iron supports substantially immediate reduction of Cr(VI) on surface sites and in pore water and also provides a source of renewable and long-term reductive poise. This step also continues the process of displacing Cr(VI), weathering of the parent minerals, and stabilizing pH.

Suitable iron sources include but are not limited to ferrous sulfate, ferrous chloride, ferrous citrate, ferrous nitrate, and ferrous gluconate. Sufficient iron would be added in a single application to yield approximately 2% iron by weight or up to a 3 to 1 molar ratio of iron to Cr(VI). Iron demands to support this step will vary depending on the specific characteristics of the COPR involved, and so must be verified through testing at the bench scale.

Biogeochemical Reduction of Cr(VI) to Cr(III).

In another embodiment of the invention, the invention relates to a novel treatment method of adding amendment(s) to COPR or other chromate impacted solids for the purpose of supporting longer-term biogeochemical Cr(VI) reduction enhanced by recycling of the chemical reductant, ultimately rendering the material non-hazardous as measured by acceptable methods.

Amendment(s) include a fermentable organic carbon source to stimulate rapid microbial growth, creating a strongly anaerobic environment that is sustained over a sufficient timeframe to reduce the remaining Cr(VI), including more recalcitrant Cr(VI). The carbon donor and fermentation products can yield additional acidity for further chemical weathering of parent COPR minerals responsible for lithification, bulking, and buffering elevated pH; liberating additional Cr(VI) for treatment. Redox cycling of the previously added iron via the anaerobic activity provides a renewable source of reductive potential during the treatment. The anaerobic activity can also create reactive iron mineral phases that can be reactive with Cr(VI) over the long-term.

The addition of a fermentable organic carbon source rapidly creates a strongly anaerobic environment. This provides a very efficient source of electrons which in turn optimizes effective dosing. Substrate fermentation generates additional acidity to promote mineral weathering and pH stabilization, and reduces incorporated Cr(VI). This process is aggressive and residence time can be long, which in conjunction with the other elements helps achieve complete treatment.

Bioaugmentation can also be achieved through amendment(s) that include a source of active anaerobic microbes from naturally brackish environments to support more rapid stimulation of microbial populations.

Suitable fermentable organic carbon sources include but are not limited to dry granulated sugars or solutions of the following: dextrose, sucrose, molasses, and corn syrup. Sufficient carbon would be added to yield sufficient reducing equivalents to reduce all of the Cr(VI) in an untreated sample, plus all of the supplemental iron added, plus a suitable safety factor and yield a minimum of 5,000 mg/kg total organic carbon in the soil. Carbon substrate demands to support this step will vary depending on the specific characteristics of the COPR involved, and so must be verified through testing at the bench scale.

FIG. 1 presents a process flow chart showing the steps involved in the treatment of the COPR according to one embodiment of the invention. The process is adaptable depending on the nature of the material to be treated. Depending on what is appropriate, it can involve some or all of the identified process steps, and can potentially be applied in-situ as well as ex-situ to achieve the performance objectives.

In Step 110, mineral acid is added to COPR to be treated. The treatment accelerates weathering of the COPR. Once the material is titrated to an ambient pH of 9.0 s.u. or less, at Step 120, ferrous iron is added to the COPR based on the characteristics of the COPR being treated. The ferrous iron treatment chemically reduces available Cr(VI) to Cr(III). Once this step is completed (or in conjunction), at Step 130 a fermentable organic carbon source is added to biologically reduce the remaining Cr(VI) and further stabilize the pH of treated material.

EXAMPLE

This example is intended to detail the results of testing of the process of the invention, however the description of this example is not intended to limit the scope of the invention in any way. Samples from two different areas were received from a site that contains COPR historically used as fill. These samples represented vertically integrated composites of material collected over a 15 foot interval in the subsurface, and were designated GA1 and GA2. The material from each was used for proof of concept treatability testing in the laboratory according to the following steps:

Step 1: Homogenization.

Samples were homogenized through hand mixing and crushing to create substantially "uniform" composites.

Step 2: Baseline Analysis.

The homogenized composite samples were analyzed in duplicate for total Cr and Cr(VI), TCLP for total chromium, total organic carbon, percent solids, and various other metals (aluminum, calcium, magnesium, and iron). Results are summarized below in Table 1:

TABLE 1

| Analyte | Unit | GA1 Composite | | GA2 Composite | |
|---|---|---|---|---|---|
| Total organic carbon | mg/kg wet | 27,000 | 25,000 | 25,000 | 17,000 |
| Percent solids | % | 60% | 59% | 65% | 65% |
| pH | s.u. | 12.3 | | 12.5 | |
| Aluminum | mg/kg | 27,000 | 25,000 | 34,000 | 30,000 |
| Calcium | mg/kg | 190,000 | 210,000 | 280,000 | 270,000 |
| Magnesium | mg/kg | 35,000 | 33,000 | 40,000 | 36,000 |
| Iron | mg/kg | 53,000 | 52,000 | 79,000 | 70,000 |
| Chromium | mg/kg | 45,000 | 46,000 | 31,000 | 28,000 |
| Hexavalent Chromium | mg/kg | 22,000 | 20,000 | 4,900 | 4,500 |
| TCLP (total chromium) | mg/L | 360 | 340 | 28 | 13 |

Step 3: Treatment Sample Setup

For each homogenate, a control sample was prepared, along with a treatment sample. The control sample was only subjected to the acid titration while the treatment sample was subjected to the full-process.

Step 4: Acid Titration

Both the control and the treatment sample for each homogenate were titrated with 20% v/v sulfuric acid to adjust the pH to a range that supported microbial activity. Acid was added incrementally until the target pH of approximately 9 s.u. was achieved; the volume of acid was recorded in order to determine the acid demand of the soil.

Step 5: Batch Treatment Dosing.

Following titration, all samples were saturated to a uniform consistency in open top batch reactors (pots) that were incubated in a glove box and manually stirred on a weekly basis. The treatment samples were then dosed with the following admixtures:

Biologically active sea sediment at 1.5% (wt/wt) & corn silage at 10% (v/v).

Sufficient molasses to yield the following:

1,000 mg TOC/Kg soil—sample GA2

10,000 mg TOC/Kg soil—sample GA1

Sufficient ferrous sulfate to yield the following:

2 g/kg Fe—sample GA2

20 g/Kg Fe—sample GA1

Step 6: Treatment Monitoring

Treatment curing occurred over approximately 110 days, with pH and Cr(VI) analyzed approximately 5 times over that timeframe.

Upon completion of the curing cycle, a final TCLP analysis was also completed for Cr(VI).

Test Results.

Figure 2:
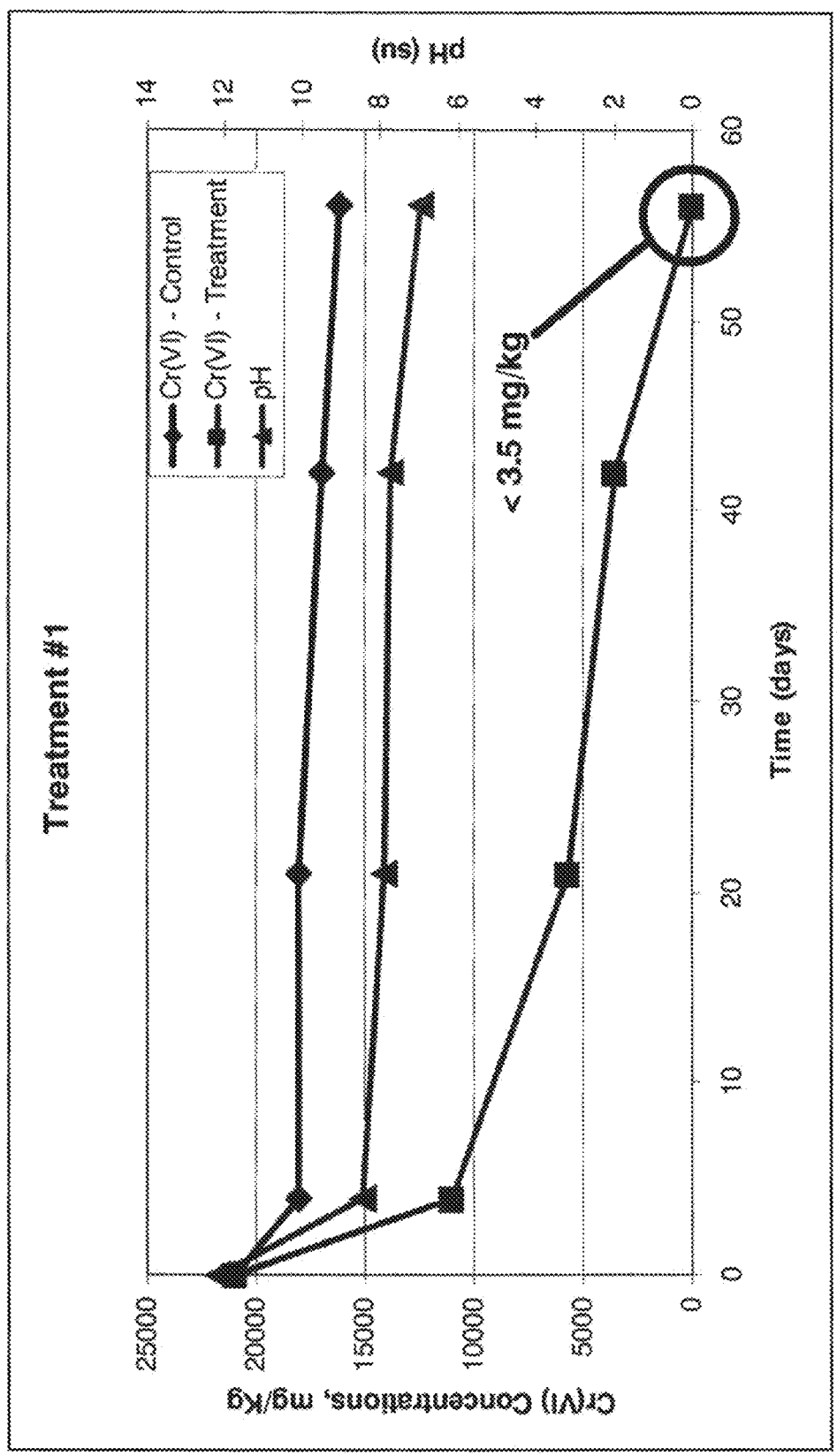
FIG. 2 depicts the progression of pH and Cr(VI) concentration in COPR for chromium impacted solids when treated according to one embodiment of the invention.

Table 2 shows the progression of pH and Cr(VI) concentration in COPR over time for the controls and test samples with a graphical representation for GA1 depicted in FIG. 2.

TABLE 2

| Description | | Time (days) | | | | | |
|---|---|---|---|---|---|---|---|
| | | 0* | 4 | 21 | 42 | 56 | 110 |
| GA2 Control | mg/kg Cr(VI) | 4700 | 6,100 | 4,300 | 4,000 | 4,000 | 3,260 |
| | pH | 12.3 | 8.9 | 8.7 | 8.4 | 8.5 | — |
| GA2 Treatment | mg/kg Cr(VI) | 4700 | 4,300 | 2,400 | 1,500 | 270 | 15.3 |
| | pH | 12.3 | 9.0 | 8.2 | 7.4 | 7.2 | — |
| GA2 TCLP | mg/L Cr(VI) | 115 | — | — | — | — | 2.3 |

TABLE 2-continued

| Description | | Time (days) | | | | | |
|---|---|---|---|---|---|---|---|
| | | 0* | 4 | 21 | 42 | 56 | 110 |
| GA1 Control | mg/kg Cr(VI) | 21000 | 18,000 | 18,000 | 17,000 | 16,000 | 20,000 |
| | pH | 12.5 | 9.0 | 8.3 | 8.0 | 7.9 | — |
| GA1 Treatment | mg/kg Cr(VI) | 21000 | 11,000 | 5,700 | 3,500 | <3.5 | 34.8 |
| | pH | 12.5 | 8.4 | 7.9 | 7.8 | 7.0 | — |
| GA1 TCLP | mg/L Cr(VI) | 410 | — | — | — | — | 2.6 |

*Average baseline values used for Cr(VI)

The pH for the treated samples dropped to the target of 9 within approximately 5 days, which was followed by additional neutralization due to organic acid production by microbial activity. Cr(VI) concentrations in sample GA1 were reduced from greater than 20,000 mg/kg to less than 35 mg/kg in approximately 110 days, with TCLP Cr(VI) dropping from 115 mg/L to less than 3 mg/L. The Cr(VI) concentration in the untreated control sample remained near 20,000 mg/kg over the same period. Cr(VI) concentrations in sample GA2 were reduced from 4,700 mg/kg to 15 mg/kg in approximately 110 days, with TCLP Cr(VI) dropping from 410 mg/L to less than 3 mg/L. The Cr(VI) concentration in the untreated control sample remained between 3,000 and 4,000 mg/kg over the same period.

On completion of the testing, the treated material was stored in the laboratory in a moist condition and in contact with the atmosphere. Three and a half years after the initial treatment this material was sacrificed to look at pH, and to submit material for analysis at Brookhaven National Lab by X-ray absorption spectroscopy (XAS) to look for the presence of Cr(VI). XAS is a technique that can provide elemental speciation data using microprobe X-ray fluorescence (μXRF) and X-ray adsorption near-edge structure (XANES). It relies on a focused beam of x-rays to determine the presence, distribution, valence state, and form of different elements at high resolutions (down to 10-micron spots). It can be used to create elemental maps by moving the beam across an area of a sample and recording the fluorescence at each spot. Samples are not altered in any way prior to analysis; they are simply placed into instrument specific sample holders prior to analysis. Consequently, this technique is not susceptible to redox bias during analysis. The results of these activities determined that the pH of the treated material was still in the neutral range (approximately 7.7 for both GA1 and GA2). Further, the XAS analysis did not identify any Cr(VI) in the material analyzed.

Figure 3:
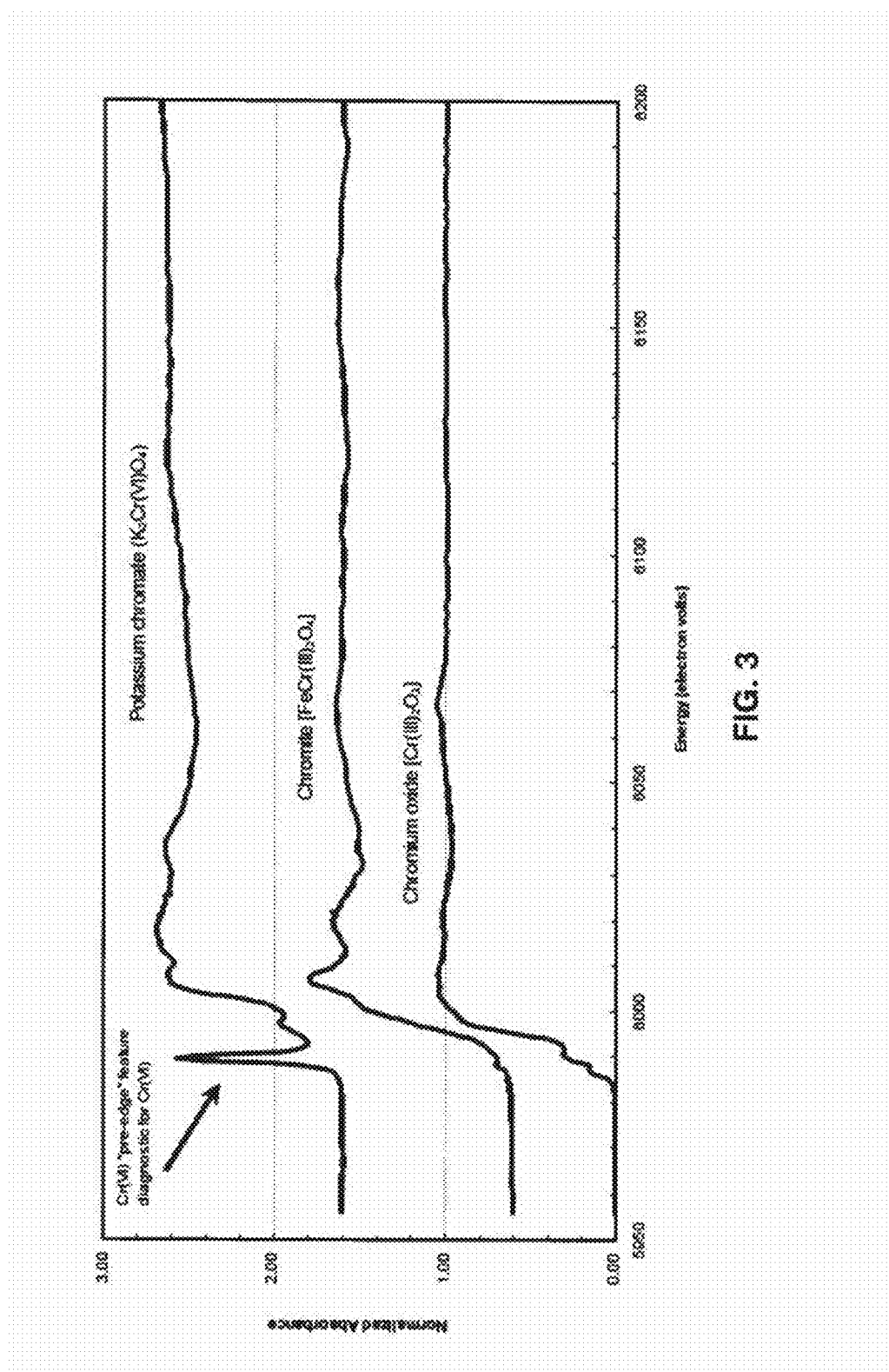
FIG. 3 depicts the x-ray absorption spectra for chromium in standard compounds of chromium salts and minerals at the Cr K-edge (5989 electron volts).

FIG. 3 shows the x-ray absorption spectra for chromium in standard compounds of chromium salts and minerals at the Cr K-edge (5989 electron volts). Microprobe x-ray absorption analysis was performed on the standard compounds at a synchrotron x-ray facility. Potassium chromate x-ray absorption near edge structure (XANES) spectroscopy results shows a characteristic "pre-edge" absorption feature diagnostic of the presence of Cr(VI). The Cr(III) minerals do not show this feature.

Figure 4:
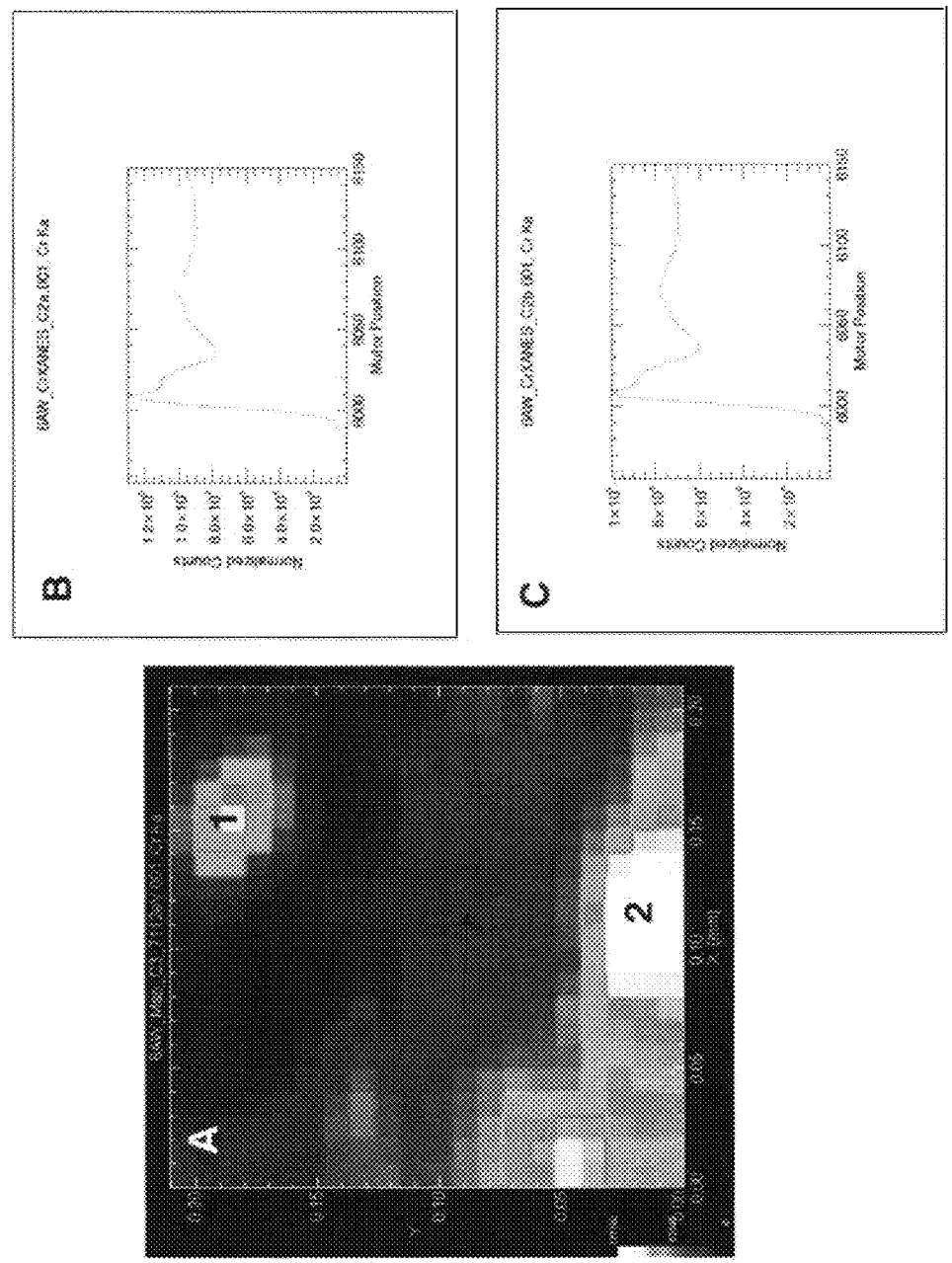
FIG. 4 depicts the results of the microprobe x-ray absorption analysis of sample GA1 after treatment according to one embodiment of the invention.

FIG. 4 shows the results of the microprobe x-ray absorption analysis of sample 6A after treatment. Panel A is a false-color image of a 200×200 micron spot in the treated soil with false colors assigned to areas of strong x-ray fluorescence indicative of the presence of chromium (light areas of the image) and absence of chromium (dark areas of the image). Areas with elevated concentrations of chromium are labeled 1 and 2. Panel B shows XANES spectrum for area 1. The spectrum lacks the diagnostic pre-edge feature for Cr(VI) and indicates that the chromium is present as Cr(III). Panel C shows the XANES spectrum for area 2, also indicating that chromium is present as Cr(III). These data, along with the bulk analysis of the chemical speciation of Cr in the treated COPR, demonstrate the treatment of Cr(VI) in the COPR and conversion to Cr(III).

The foregoing embodiments have been presented for the purpose of illustration and description only and are not to be construed as limiting the scope of the invention in any way.

The invention claimed is:

1. A method for treatment of chromite ore processing residue or other chromate impacted solids comprising:
    treating the chromite ore processing residue or other chromate impacted solids with mineral acid to an ambient pH at or below approximately 9.0 s.u.;
    thereafter treating the chromite ore processing residue or other chromate impacted solids with a source of ferrous iron; and
    thereafter treating the chromite ore processing residue or other chromate impacted solids with a fermentable organic carbon source;
    wherein the Cr(VI) in the chromite ore processing residue or other chromate impacted solids is substantially reduced to Cr(III); and
    further wherein the Cr(III) in the chromite ore processing residue or other chromate impacted solids is immobilized and biogeochemically fixed.

2. The method of claim 1 wherein the mineral acid comprises sulfuric acid; hydrochloric acid; nitric acid; or phosphoric acid.

3. The method of claim 2, wherein the mineral acid treatment comprises a single treatment.

4. The method of claim 2, wherein the source of ferrous iron comprises ferrous sulfate, ferrous chloride, ferrous citrate, ferrous nitrate, or ferrous gluconate.

5. The method of claim 4, wherein the ferrous iron treatment comprises addition to yield approximately 2% iron by weight or up to a 3 to 1 molar ratio of iron to Cr(VI).

6. The method of claim 5, wherein the ferrous iron treatment comprises a single treatment.

7. The method of claim 4, wherein the fermentable organic carbon source comprises dry granulated sugars or solutions of dextrose, sucrose, molasses, or corn syrup.

8. The method of claim 7, wherein the fermentable organic carbon source treatment comprises providing at least an amount of the fermentable organic carbon source to yield sufficient reducing equivalents to reduce the Cr(VI) and the added ferrous iron to yield a minimum of approximately 5,000 mg/kg total organic carbon in the chromite ore processing residue or other chromate impacted solids.

9. The method of claim 8, wherein the fermentable organic carbon source treatment creates a strongly anaerobic environment.

10. The method of claim 1, wherein the total chromium level in the treated chromite ore processing residue or the chromate impacted solids is rendered less than approximately 5 milligrams per liter (mg/L) as measured by the Toxicity Characteristic Leaching Procedure ("TCLP").

11. The method of claim 1, wherein the total Cr(VI) level in the treated chromite ore processing residue or the chromate impacted solids is rendered less than approximately 20 mg/kg Cr(VI).

12. The method of claim 11, wherein the total Cr(VI) level in the treated chromite ore processing residue or the chromate impacted solids is rendered less than approximately 1 mg/kg Cr(VI).

13. The method of claim 1, wherein groundwater containing chromite ore processing residue or other chromate impacted solids treated according to the method of claim 1 comprises no more than 100 micrograms per liter (μg/L) for total chromium.

14. A method for treatment of chromite ore processing residue or other chromate impacted solids comprising:
    treating chromite ore processing residue or other chromate impacted solids with mineral acid to an ambient pH at or below approximately 9.0 s.u.;
    thereafter treating the chromite ore processing residue or other chromate impacted solids with a source of ferrous iron;
    thereafter treating the chromite ore processing residue or other chromate impacted solids with a fermentable organic carbon source; and
    thereafter treating the chromite ore processing residue or other chromate impacted solids with a source of active anaerobic microbes,
    wherein the Cr(VI) in the chromite ore processing residue or other chromate impacted solids is substantially reduced to Cr(III); and
    further wherein the Cr(III) is immobilized and biogeochemically fixed.

15. The method of claim 14, wherein the mineral acid treatment comprises titration of the chromite ore processing residue or other chromate impacted solids with sulfuric acid; hydrochloric acid; nitric acid; or phosphoric acid.

16. The method of claim 15, wherein the ferrous iron treatment comprises addition of ferrous sulfate, ferrous chloride, ferrous citrate, ferrous nitrate, or ferrous gluconate to the chromite ore processing residue or other chromate impacted solids to yield approximately 2% iron by weight or up to a 3 to 1 molar ratio of iron to Cr(VI).

17. The method of claim 16, wherein the fermentable organic carbon source treatment comprises providing an amount of dry granulated sugars or solutions of dextrose, sucrose, molasses, or corn syrup to the chromite ore processing residue or other chromate impacted solids to yield sufficient reducing equivalents to reduce substantially all of the Cr(VI) and substantially all of the added ferrous iron to yield a minimum of approximately 5,000 mg/kg total organic carbon in the chromite ore processing residue or other chromate impacted solids.

18. The method of claim 14, wherein the total chromium level in the treated chromite ore processing residue or the chromate impacted solids is rendered less than approximately 5 milligrams per liter (mg/L) as measured by the Toxicity Characteristic Leaching Procedure ("TCLP").

19. The method of claim 14, wherein the total Cr(VI) level in the treated chromite ore processing residue or the chromate impacted solids is rendered less than approximately 20 mg/kg Cr(VI).

20. The method of claim 19, wherein the total Cr(VI) level in the treated chromite ore processing residue or the chromate impacted solids is rendered less than approximately 1 mg/kg Cr(VI).

21. A method for treatment of chromite ore processing residue or other chromate impacted solids comprising:
   treating chromite ore processing residue or other chromate impacted solids with mineral acid;
   optionally thereafter treating the chromite ore processing residue or other chromate impacted solids with a source of ferrous iron and optionally substantially simultaneously treating the chromite ore processing residue or other chromate impacted solids with a fermentable organic carbon source; and
   optionally thereafter treating the chromite ore processing residue or other chromate impacted solids with a source of active anaerobic microbes,
   wherein the Cr(VI) in the chromite ore processing residue or other chromate impacted solids is substantially reduced to Cr(III); and
   further wherein the Cr(III) is immobilized and biogeochemically fixed,
   wherein the mineral acid treatment comprises titration of the chromite ore processing residue or other chromate impacted solids with sulfuric acid; hydrochloric acid; nitric acid; or phosphoric acid to an ambient pH at or below approximately 9.0 s.u.,
   wherein further the ferrous iron treatment comprises addition of ferrous sulfate, ferrous chloride, ferrous citrate, ferrous nitrate, ferrous gluconate or a combination thereof to the chromite ore processing residue or other chromate impacted solids to yield approximately 2% iron by weight or up to a 3 to 1 molar ratio of iron to Cr(VI),
   wherein further the fermentable organic carbon source treatment comprises providing an amount of dry granulated sugars or solutions of dextrose, sucrose, molasses, or corn syrup to the chromite ore processing residue or other chromate impacted solids to yield sufficient reducing equivalents to reduce substantially all of the Cr(VI) and substantially all of the added ferrous iron to yield a minimum of approximately 5,000 mg/kg total organic carbon in the chromite ore processing residue or other chromate impacted solids, and
   wherein further the total Cr(VI) level in the treated chromite ore processing residue or the chromate impacted solids is rendered less than approximately 20 mg/kg Cr(VI).

* * * * *